(No Model.)

J. G. JOHNSTON.
METHOD OF AND APPARATUS FOR MANUFACTURING SECONDARY BATTERY ELECTRODES.

No. 442,187. Patented Dec. 9, 1890.

Witnesses:
Ed. E. Clement
Chas. L. Williams

James G. Johnston
Inventor:
by A. G. Safford

UNITED STATES PATENT OFFICE.

JAMES G. JOHNSTON, OF DENVER, COLORADO.

METHOD OF AND APPARATUS FOR MANUFACTURING SECONDARY-BATTERY ELECTRODES.

SPECIFICATION forming part of Letters Patent No. 442,187, dated December 9, 1890.

Application filed August 15, 1890. Serial No. 362,053. (No model.)

*To all whom it may concern:*

Be it known that I, JAMES G. JOHNSTON, a citizen of the United States, residing at Denver, in the county of Arapahoe and State of Colorado, have invented certain new and useful Improvements in Machines for the Manufacture of Electrodes for Secondary or Electric Storage Batteries; and I do hereby declare that the following is a full, clear, and exact description of the invention, which will enable others skilled in the art to which it appertains to make and use the same.

My invention relates to the manufacture of that class of electrodes for secondary or electric storage batteries in which the active material is contained in an external envelope or supporting-case, the whole being perforated through and through with a multiplicity of small holes, such an electrode as is described in the patent issued to H. H. Carpenter on the 15th day of October, 1889, and numbered 412,727.

Heretofore great difficulty has been experienced in filling the external case or envelope with the active material in a dry form; and the object of my invention is to remove that difficulty and at the same time provide the electrode with the necessary perforations.

Figure 2:
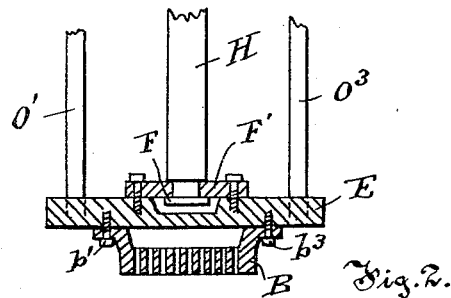
Figure 1:
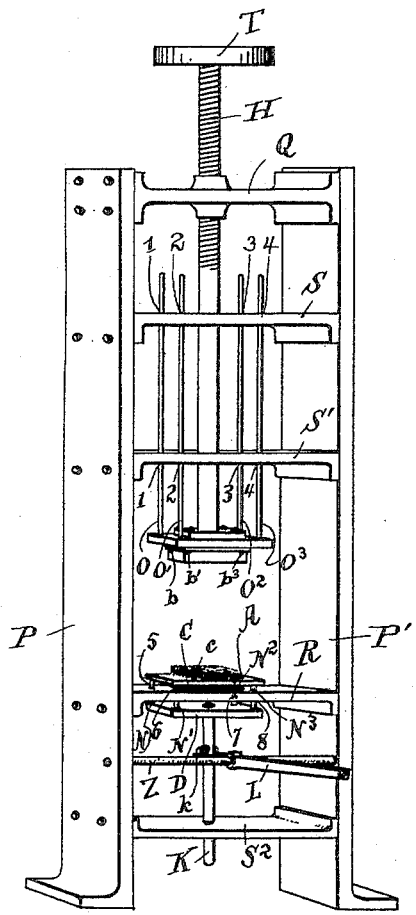
Figure 3:
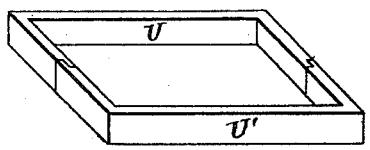
Figure 4:
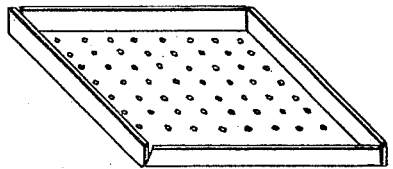

Referring to the accompanying drawings, wherein the same indicating letters and numerals point out the same parts on each view; Figure 1 represents a view in perspective of the whole machine. Fig. 2 represents an enlarged sectional view of the plunger and supporting and actuating mechanism. Fig. 3 represents the clamps for upturning the edges of the external case. Fig. 4 represents one-half of the external case after perforation and with upturned edges.

In Fig. 1, P P' are the supports, and Q R S S' S² are the guide-braces of the frame, the whole frame being constructed of wrought or cast iron or other suitably rigid material. All the guide-braces are bolted at either end to the supports, as distinctly shown in the drawings, so as to make the whole rigidly and firmly connected, and are perforated vertically to receive and direct certain of the reciprocating parts of the machine, as is hereinafter more specifically pointed out. These braces may be of any desired shape; but I have found in practice that the best form is that delineated, wherein they are made straight with the extremities turned at right angles, so as to form a flange to receive the connecting-bolts, and placed in the machine horizontally. These braces vary somewhat in general form, but perform similar functions.

The guide-brace Q is provided with a central screw-threaded perforation constructed to carry the reciprocating compressing-screw H. The guide-braces S S' are perforated in their centers to permit the passage of the reciprocating compressing-screw H, and are also perforated at 1 2 3 4 to permit the reciprocating guide-posts O O' O² O³ to move upward and downward. The guide-brace R is perforated at 5 6 7 8 to permit the reciprocating guide-posts N N' N² N³, which are attached to the block D, to move upward and downward. The guide-brace S² is centrally perforated to control the upward and downward movement of the rod K.

The reciprocating compressing-screw H is provided at its upper extremity with a hand-wheel T, its thread fitting into the screw-threaded perforation in the guide-brace Q, and it is kept in an exact vertical position by means of the guide-posts O O' O² O³, which fit into the perforations 1 2 3 4 of the guide-braces S S', as well as by the central perforations in those guide-braces, in which the unthreaded portion of the compressing-screw also fits. Said compressing-screw passes through the plate F', being provided at its lower extremity with the flange F, and the plate F' being bolted to the block E, which is recessed to receive the flange F, it is obvious that whenever the compressing-screw is raised or lowered it will carry with it the block E, which, by means of the guide-posts O O' O² O³, working into the perforations of the guide-braces 1 2 3 4, keeps said block E at all times at right angles with the line of movement of said reciprocating screw H. The block E is provided with the detachable upper die B, attached by means of the screws $b$ $b'$ $b^2$ $b^3$. It is perforated in alignment with the vertical punch-rods $c$, attached to the detachable lower die C. Said upper die B is recessed at its upper portion, so as to permit the punch-rods $c$ to pass completely through the perforations and into said recess, said block E being so perforated in alignment with and for the purpose of receiving the punch-rods c of the lower die C. The lower die C is detachable, and is provided with the punch-rods c, exactly fitting into the aligning perforations in the upper die B, and also into the perforations of the stripper A. It is bolted firmly to the guide-brace R, which forms the bed of the die, and is perforated in alignment with and to receive the posts N N' N² N³. The stripper A is perforated to correspond with the punch-posts c and rests on the die C, being moved upward by said posts N N' N² N³ when the lever L is depressed. The block D is supported by the reciprocating rod K, to which it is firmly attached, and is provided with the posts N N' N² N³, which are guided by the perforations 5 6 7 8, so as to elevate vertically the stripper A. The reciprocating rod K is guided at its lower end by the central perforation in the guide-brace S², and is provided with the wheel k, fastened to it and by which it receives its upward motion from the lever L. The lever L is supported by the fulcrum-rod Z, one end working upon the wheel k, the power being applied to the other end.

Fig. 2 shows a cross-section of the upper die B, the block E, and the connections thereof. Fig. 3 shows the forming-clamps U U'. Fig. 4 shows one-half of the case for the electrode in perspective after being perforated and formed by the operation of the machine.

The method of operating the above-described machinery in forming and filling a perforated electrode for electrical or secondary storage batteries may now be readily understood, and is as follows: Having determined upon the size of the proposed plate, a blank of suitable metal is provided sufficient in shape to make one face or side of the electrode, and having also determined upon the size and number of the perforations, and the appropriate upper and lower dies having been attached to the machine, and a corresponding stripper provided, the blank is placed on the punch-rods c. Then by turning the handle T the compressing-screw is caused to descend, the upper die being kept horizontally by means of the guide-posts O O' O² O³ until said punch-rods pass entirely through the metal and into the perforations in the die B. The edges are then upturned, and the forming-clamps U U' are placed around the upturned flanges, and upon being struck the flanges of the plate are formed at right angles. The compressing-screw H is then raised and the lever L depressed, which pushes the stripper A upward, and the punched and shaped metal blank is forced off the ends of the vertical punch-rods c. This process forms one half of the case and a repetition of the process forms the other half. One of these halves is then placed back upon the punch-rods. The stripper A is caused to move upward just so far that the punch-rods shall pass through the formerly-made perforations and extend beyond the same a little more than the predetermined thickness of the electrode. This half of the case inclosing the punches is then filled with the dry active material, generally one of the plumbic oxides. The screw H is then brought down until the punch-rods extend through the active material sufficiently to receive the perforations in the second half, which is inverted and placed thereon. The compressing-screw H is first raised to permit the affixing of the second half. It is then again brought down and sufficient pressure given to it to form the active material into a dry perforated cake and surrounded by the perforated envelope or supporting-case, the perforations in the external case and in the filling of active matter exactly coinciding. The lever L is then depressed, and the stripper A pushes off the formed electrode, which is then ready to be immersed in sulphuric acid, which fixes the active matter in place, and the whole is then ready to be sealed up by having its sides and ends burned together or otherwise firmly welded or connected.

Having thus described my invention, what I claim, and desire to secure by Letters Patent, is—

1. The process of forming secondary-battery plates having a perforated metallic envelope or supporting-case, which consists in separately striking up and perforating the metallic sides of the plate, and then assembling said sides and the active material in a dry state upon the punching-die, and finally compressing the whole together in said die, as and for the purpose intended, substantially as described.

2. In an apparatus for the manufacture of secondary or electric storage battery plates having a metallic inclosing and supporting case or envelope perforated through and through from side to side with a multiplicity of holes, the combination of a supporting-frame, guide-braces in said frame, a vertically-reciprocating compressing-die, guide-rods extending from said die through the guide-braces, a stationary die having a multiplicity of punch-rods projecting therefrom, a stripper-plate on said stationary die, and a lever for operating said plate, substantially as described.

JAMES G. JOHNSTON.

In presence of—
WILLIAM N. McBIRD,
MASON B. CARPENTER.